United States Patent Office 3,284,069
Patented Nov. 8, 1966

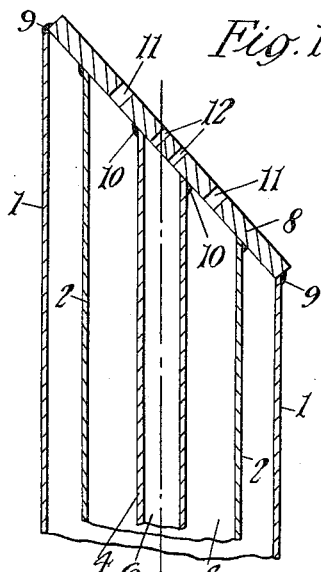
Fig.1.
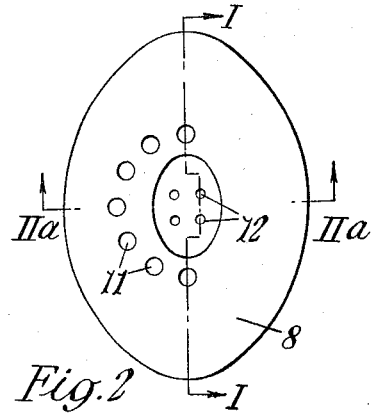
Fig.2.
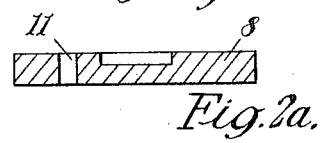
Fig.2a.
Fig.3a.
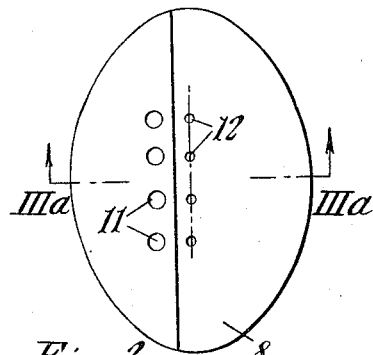
Fig.3.
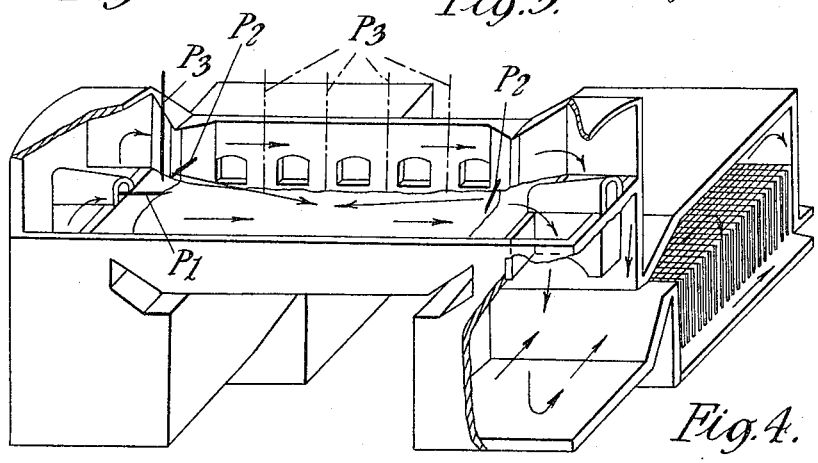
Fig.4.

3,284,069
BURNERS USED IN OPEN HEARTH FURNACES
Jean M. Levaux, Jemeppe sur Meuse, Belgium, assignor to Societe Anonyme Cockerill-Ougree
Filed Mar. 6, 1964, Ser. No. 349,821
Claims priority, application Austria, Mar. 11, 1963, 1,907/63
8 Claims. (Cl. 263—15)

This specification describes improved burners for use in furnaces such as open hearth furnaces for the production of steel.

One preferred form of a burner, to be described below, comprises two tubes arranged one inside the other so as to define an inner duct for liquid fuel surrounded by an outer duct for oxygen-enriched air, a flat plate which is oblique in relation to the tubes and is fixed to the tubes in such a manner that each of the ducts communicates separately with at least one hole in the plate, the axes of these holes being approximately perpendicular to the plate.

Embodiments of the burner in accordance with the invention, and their use in an open hearth furnace are now described with reference to the attached drawings.

FIGURE 1 is a longitudinal section of the end of a burner on the line I—I of FIGURE 2.

FIGURE 2 is a view of the plate at the end of the burner.

FIGURE 2a is a section on the line IIa—IIa of FIGURE 2.

FIGURE 3 is a view of a further plate for use on a burner in accordance with the invention.

FIGURE 3a is a section on the line IIIa—IIIa of FIGURE 3.

FIGURE 4 is a partially cut away view of an open hearth furnace showing various possible positions of a burner in accordance with the invention.

As shown in FIGURE 1 the burner comprises an outer cylindrical casing 1 sourrounding a tube 2 which surrounds a further tube and co-operates with it in forming a duct 3 of annular cross-section for the passage of air, oxygen-enriched air, or oxygen. The innermost tube 4 defines a duct 6 for the passage of fuel, e.g. fuel oil. An oblique plate 8 is welded to the ends of the tubes and has holes 11 for the passage of the oxygen or oxygen-enriched air and also holes 12 for the passage of the liquid fuel. Since the outer casing 1 is cylindrical, the plate, which can be conveniently 30 mm. in thickness, is elliptical and is attached to the casing 1 by a weld 9 and to the innermost tube 4 by a weld 10. The diameters of the holes 12 for the fuel can conveniently be less than half the thickness of the plate, for instance 10 mm. Conveniently the axes of all the holes are perpendicular to the plate.

The outer face of the plate need not be plane but can have two parts at different levels as shown in FIGURES 2a and 3a. However these different parts of the face are plane-parallel to each other.

Water is circulated in the annular space between the outer casing 1 and the tube 2 in order to keep the burner cool. In one particular arrangement of the holes 11 and 12, shown in FIGURE 2 the holes 11 for the oxidizing gas, i.e. the gas with which the fuel is to burn, partially surround the holes 12 for the fuel. Preferably the burner with such an arrangement of the holes is then placed in the furnace so that the holes 12 for the fuel are above the holes 11 for the oxidizing gas and in this manner the heat is directed towards the bath of molten metal in the furnace and the life of the roof or vault of the furnace is prolonged.

In an alternative arrangement, shown in FIGURE 3, the holes are arranged in groups, each group comprising one hole 11 for the oxidizing gas, and one hole 12 for the fuel so that each group produces a flattened flame in a plane sheet. Alternatively each group can comprise more than one hole of each type. When the burner is designed to produce such flattened flames the area of contact between the flames and the bath is increased together with the rate of heat transfer. Moreover the holes in the groups can be oval so that their major transverse axes, within a given type of hole, coincide when extended. Or to put it in other words, in each type the holes are elongated so as to be oval in cross section along a single line.

The combination of the fuel and the oxidizing gas outside the burner can take place in accordance with two methods.

In accordance with the first method, the axes of the holes are all parallel and the oxidizing gas, which can conveniently be commercially pure oxygen is caused to emerge with a speed which is twice that of sound or double that of sound. As a result the following advantages are found:

(1) The very high rate of speed of the oxygen increases the flame temperature.

(2) The fuel is well atomised at a distance from the head of the burner.

(3) It is impossible for a blow back to occur since the oxygen is moving at a speed above the maximum blow back speed.

(4) Hence there is a good distance between the head of the burner and the beginning of the combustion zone so that the burner is well protected from the heat of the flame.

In accordance with the second method of operating a burner in accordance with the invention the axes of the holes of one type are inclined towards the axes of the holes of the other type; for example all the axes can converge on a single point. In this case the zone of the flame is at a smaller distance from the head of the burner.

As shown in FIGURE 4 there are three possible different positions of the burner in accordance with the invention.

In the position indicated by $P_1$ the burner is placed in the doghouse on the uptake side.

In the four positions indicated by $P_2$ the burners are placed at the four corners of the bath so that their flames are directed along the diagonals of the bath at a small distance from it. In this case the burners are perpendicular to the walls of the furnace which extend from the uptake to the downtake parts of the furnace.

As shown in FIGURE 4 one or more of the burners can be placed in one or more of the positions indicated by $P_3$ in the roof of the furnace. In this case the flames are directed along the bath towards the downtake side.

One particular arrangement of the positions $P_2$ and $P_3$ is that the furnace can be built without doghouses so that the cross section of the uptake passage can be increased and consequently the velocity of the gas coming up can be reduced so that the wear of the adjacent walls is reduced.

Whilst I have described a few embodiments of my invention in detail, it is to be understood that the monopoly I claim in the United States is not to be limited to the specific embodiments but is to be defined by the spirit and gist of the following patent claims.

I claim:

1. In a furnace, a burner comprising two tubes placed one inside the other so as to define an inner duct surrounded by and discrete from an outer annular duct, a flat plate which is oblique in relation to the tubes and is fixed to the tubes in such a manner that each of the ducts communicates separately with at least one hole in the plate, the axes of these holes being approximately perpendicular to the plate, the burner passing through an aperture in the wall of the furnace, the axes of the holes in the plate extending into the furnace.

2. In a furnace, a burner comprising separate duct means for fuel and oxidizing gas, an oblique plate fixed at the end of these duct means, the plate having holes communicating with the duct means and being oblique in relation to the axis of the duct means, the holes in the plate being approximately perpendicular to the plate, the burner projecting through a hole in a wall of the furnace, the axes of the hole in the plate projecting into the furnace.

3. A burner comprising two tubes placed one inside the other so as to define an inner duct surrounded by and separated from an outer annular duct, a flat plate which is oblique in relation to the tubes and is fixed to the tube in such a manner that each of the ducts communicates with at least one hole in the plate, cooling means surrounding the outer duct, the axes of these holes being approximately perpendicular to the plate, and the diameter of the holes being less than the thickness of the plate.

4. The structure as set forth in claim 3 in which the diameter of all the holes is half the thickness of the plate, the thickness of the plate being at least 30 mm.

5. In an open hearth furnace a burner comprising two tubes placed one inside the other so as to define an inner duct surrounded by an outer annular duct, a flat plate which is oblique in relation to the tubes and is fixed to the tubes in such a manner that each of the ducts communicates with at least one hole in the plate, liquid fuel emerging into the furnace from some of the holes which are above the rest of the holes, while oxidizing gas emerges from the last-named holes, the burner lying in an aperture in the wall of the furnace.

6. In an open hearth furnace, a burner comprising two tubes placed one inside the other so as to define an inner duct surrounded by an outer annular duct, the ducts being filled respectively with liquid fuel and oxidizing gas under pressure, a flat plate which is oblique in relation to the tubes and is fixed to the tubes in such a manner that each of the ducts communicates with at least one hole in the plate, the axes of these holes being approximately perpendicular to the plate, while separate flames emerge from groups of the holes, into the furnace, the burner lying in an aperture in the wall of the furnace.

7. The structure as set forth in claim 6 in which the flames produce a plane sheet of flame.

8. The structure as set forth in claim 7 in which four such burners are placed at corners of the furnace interior and their flames are directed along the diagonals of the interior.

References Cited by the Examiner

UNITED STATES PATENTS

| 1,506,840 | 9/1924 | Kernohan et al. | |
| 1,707,772 | 4/1929 | Robinson. | |
| 2,931,430 | 5/1960 | Marshall | 158—11 |
| 3,051,462 | 8/1962 | Fennel | 263—15 |

FOREIGN PATENTS

| 450,531 | 7/1936 | Great Britain. |

FREDERICK L. MATTESON, Jr., *Primary Examiner.*

JOHN J. CAMBY, *Examiner.*